United States Patent [19]

Kropp

[11] 4,202,553
[45] May 13, 1980

[54] SEAL CARTRIDGE FOR AGITATOR SHAFT OF A CHEMICAL REACTOR

[75] Inventor: Donald E. Kropp, Ft. Thomas, Ky.

[73] Assignee: Ceramic Coating Company, Newport, Ky.

[21] Appl. No.: 957,529

[22] Filed: Nov. 3, 1978

[51] Int. Cl.² .................................................. F16J 15/34
[52] U.S. Cl. .......................................... 277/41; 277/61; 277/65; 277/93 SD; 277/190
[58] Field of Search .................................. 277/38–41, 277/61, 65, 92, 62, 93 R, 93 SD, 95, 85, 87, 117–119, 190, 191

[56] References Cited

U.S. PATENT DOCUMENTS

| 875,934 | 1/1908 | King | 277/61 |
|---|---|---|---|
| 2,931,631 | 4/1960 | Harrison | 277/62 X |
| 3,250,539 | 5/1966 | Kurz et al. | 277/41 |
| 3,361,431 | 1/1968 | Liss et al. | 277/93 X |
| 3,582,089 | 6/1971 | Amorese | 277/38 |
| 3,582,092 | 6/1971 | Amorese | 277/87 |
| 3,877,706 | 4/1975 | Haas et al. | 277/41 |
| 3,931,978 | 1/1976 | Grimston | 277/93 SD |
| 4,007,940 | 2/1977 | Chapa | 277/93 R |
| 4,094,513 | 6/1978 | Kime et al. | 277/41 |
| 4,109,920 | 8/1978 | Wiese | 277/65 X |

FOREIGN PATENT DOCUMENTS

| 1650132 | 10/1970 | Fed. Rep. of Germany | 277/62 |
|---|---|---|---|
| 2113703 | 12/1971 | Fed. Rep. of Germany | 277/62 |
| 40-28648 | 4/1965 | Japan | 277/62 |

Primary Examiner—Robert S. Ward, Jr.
Attorney, Agent, or Firm—Kinney and Schenk

[57] ABSTRACT

A seal cartridge for the upper end-adjacent portion of a rotatable agitator shaft which projects upwardly through the drive nozzle of a chemical reactor vessel includes an outer housing which is adapted to be fixedly anchored relative to the drive nozzle, said housing containing sealing means which are removably secured to and carried by the agitator shaft whereby to rotate with the shaft interiorly of the housing and wherein the sealing means are removable from said housing for purposes of inspection and/or replacement after the housing has been removed from the shaft.

22 Claims, 6 Drawing Figures

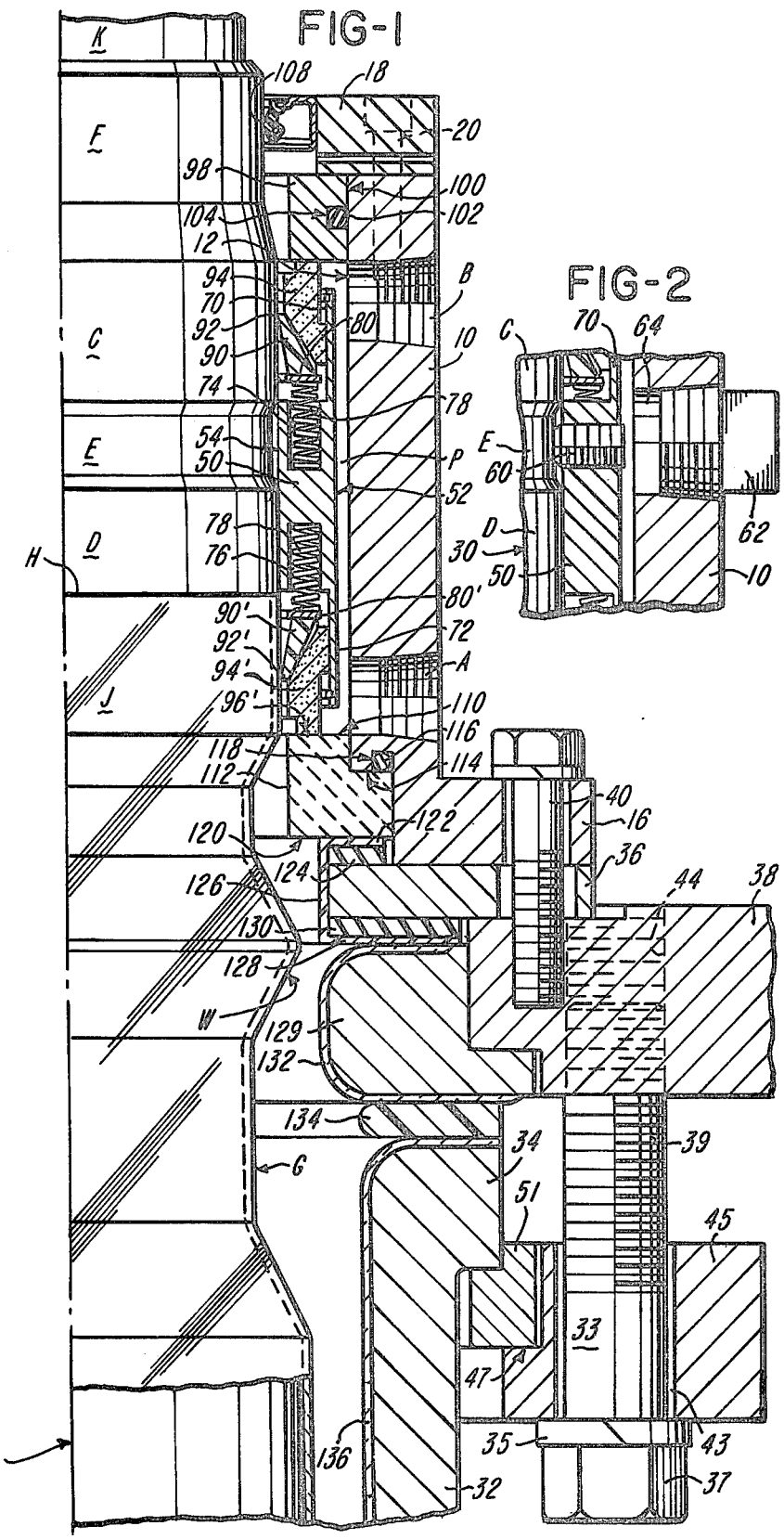

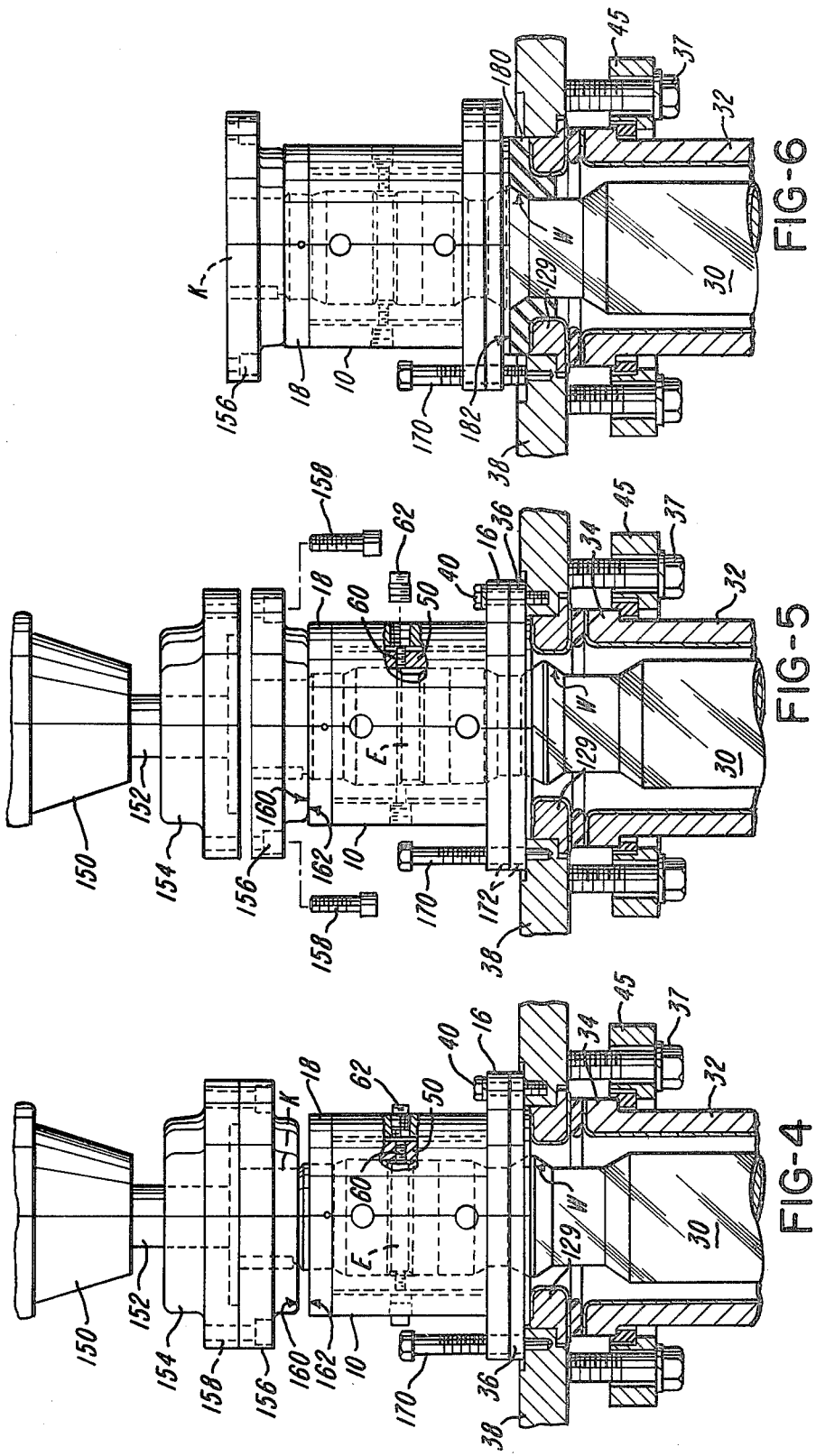

SEAL CARTRIDGE FOR AGITATOR SHAFT OF A CHEMICAL REACTOR

BACKGROUND OF THE INVENTION

1. Field of the Invention

The invention relates to means for sealing the upper end-adjacent portion of the rotatable agitator shaft of a chemical reactor vessel against the escape of gas, vapor, or liquid from the interior of the vessel along the agitator shaft.

2. Description of the Prior Art

U.S. Pat. No. 2,931,631 to E. S. Harrison discloses a mechanical sealing assembly and method of operation wherein a drive bearing is releasably secured to and carried by the upper flange of the outer shell of a mechanical stack-up type of seal assembly which engages the upper end-adjacent portion of an agitator shaft which projects upwardly from the flanged drive nozzle of a reactor vessel, said shell including a lower flange which is also securely, though releasably, anchored relative to the flanged drive nozzle of the reactor vessel. A pair of vertically spaced "abutments" are formed on the agitator shaft and extend radially outward therefrom, and a pair of oppositely aligned spring-receptive metal cages are carried by the agitator shaft in spaced relationship with respect to said abutments. Compression springs housed within said cages urge carbon rings into firm engagement with corresponding annular wedge-shaped Teflon rings the inner surfaces of which bear against the outer surface of the rotatable agitator shaft.

The structural details of the seal assembly are such as to require that the outer shell or housing be unbolted from the vessel and then removed upwardly from the sealing means on the agitator shaft so that the two metal cages in which the Teflon wedges, carbon rings, and spring assemblies are housed can be released from the agitator shaft and then slid upwardly off the upper end thereof.

In other words, to inspect and repair or replace the mechanical seal necessitates the upward withdrawal and bodily removal of the upper drive portion of the agitator shaft from the lower driven portion of said shaft.

U.S. Pat. No. 3,582,092 to F. J. Amorese and E. S. Harrison discloses a nonmetallic package rotary seal assembly for use in corrosive atmosphere wherein the end of the sleeve portion of the seal assembly which is exposed to the corrosive atmosphere is glass coated and is provided with a ceramic insert which forms a seat for containing O-ring means to seal the sleeve to the agitator shaft which extends through the seal. The shaft to be sealed is provided with an annular shoulder against which a shoulder of an elongate sleeve which is secured to and carried by the outer surface of the rotating shaft, is mounted. The outer surface of an elongate sleeve is engaged by a vertically spaced pair of wedge-shaped sealing means which are disposed in contacting relationship with the outer surface of the elongate sleeve by rotating seal members each of which have axial surfaces which are disposed in abutting relationship to an upper stationary outboard seal seat and a lower ceramic stationary seal seat wherein the wedge-shaped sealing members and their respective seal members are resiliently urged into rotary fluid sealing engagement with the aforesaid stationary seal seats.

The stationary seal seats, the rotating seal members, the wedge members, and the spring are all housed within a housing which is securely fastened relative to the drive nozzle of the vessel through which the shaft projects.

That portion of the upper end of the sleeve which projects outwardly beyond the upper end of the housing is adapted to be clamped directly to the agitator shaft whereby the sleeve, the wedge-shaped seals, the seal members, and spring are caused to rotate with the agitator shaft wherein the inner surface of the sleeve is sealed at its upper and lower ends to the outer surface of the agitator shaft by O-rings.

The lower end of the sleeve is provided with a ceramic insert which is bonded to and extends inwardly toward the shaft for defining an annular chamber into which the lowermost of the O-rings is received for engaging the shaft at a location adjacent but below an annular stop on said shaft. The seal, per se, cannot be removed endwise from a shaft along with or as part of the housing or chamber 16. The sleeve cannot be removed from the agitator shaft until after the housing has been detached from its connection relative to the drive nozzle of the reactor vessel. The sleeve sealing means which are located within the housing cannot be removed until after the housing has been completely removed from the agitator shaft since access to the interior of the housing is via its open bottom end only.

U.S. Pat. No. 3,877,706 of L. L. Haas discloses a mechanical seal assembly for glass lined mixer tanks wherein the component parts of the seal are housed within a cartridge which is supported as a unit package from a single component and whereby the unit package is removable as a unit by pulling it up slidingly along the agitator shaft of a reactor vessel. An elongate cylindrical spacer-and-support sleeve depends from and is secured in driven relationship from an upper cylindrical stationary seal having a lower axial seal face which is engaged by the upper axial seal face of a rotating seal member 51 which is housed within the upper collar portion of a spring holder and for endwise axial movement therein by means of a compression spring, and wherein said seal member includes an O-ring-receptive recess for disposing the O-ring in abutting relationship with an outer surface of the agitator shaft.

The spring holder likewise includes a second depending collar portion in which a second sealing member is mounted for endwise axial movement and whose lower axial surface is disposed in contacting relationship with the upper axial surface of a lower stationary sealing member which is sealed to the inner surface of an adaptor plate releasably secured to and carried by the flange of the nozzle of the reactor vessel in which the impeller shaft extends.

The spring holder is adapted to be securely, though releasably, anchored to the outer surface of the impeller shaft intermediate the location of the O-rings which are carried by the rotating seals. The lower stationary seal member is secured against rotation by a keyed engagement with the lower end of the cylindrical spacer and seal member.

A housing 3 contains the aforesaid seal means, said housing including means for introducing a lubricant interiorly of the housing for lubricating the mechanical seal between the aforesaid axial surface of the upper and lower rotating seal members with corresponding surfaces of the upper and lower stationary seal members. The O-rings which are secured to and carried by the rotating seal members prevent the lubricant from reaching the outer peripheral surfaces of the agitator shaft.

The entire seal assembly may be removed upwardly from the interior of the housing upon removal of a split annular top plate which spans the open upper end of the housing and the upper surface of the upper stationary seal force only after the drive means for the upper end of the agitator shaft has been removed for providing an unobstructed opening through the hollow quill sleeve drive the lower end of which is fixedly disposed in spaced relationship with a considerable length of the upper end of the agitator shaft, whereby the seal assembly, per se, can be pulled upwardly through the quill sleeve off the agitator shaft and thence out the upper end of the quill sleeve.

SUMMARY OF THE INVENTION

The upper end-adjacent portion of the agitator shaft which projects upwardly through the drive nozzle of a chemical reactor vessel the interior of which is glass lined or otherwise rendered resistant to corrosive fluids, chemicals, or the like, is adapted to be provided with a removable seal cartridge. Those portions of the agitator shaft which project downwardly through the drive nozzle and into the interior of the vessel are glass coated, and said coating extends on the shaft a distance above the upper end of the drive nozzle whereas the balance of the shaft to its upper end is not glass coated.

The seal cartridge includes an outer housing which encloses the sealing elements, per se, which are secured to and carried by a seal cage which is adapted for rotation within the housing when the cage is secured to the agitator shaft. The seal cage houses upper and lower carbon seal rings each having axial surfaces which engage in abutting-sealing relationship with corresponding axial surfaces of upper and lower seal seats which are secured to and carried by the housing beyond the upper and lower ends of the seal cage. The seal cage also includes upper and lower inwardly projecting Teflon spring-loaded seals the lower of which engages a glass lined portion of the agitator shaft, whereas the upper seal engages the agitator shaft at a location above the glass coated portion thereof. The said Teflon sealing wedges effectively preclude the passage of vapors, gases, and/or fluids in either direction along the upper end-adjacent portion of the agitator shaft. The entire cartridge housing is adapted to be removed from the upper end of the agitator shaft along with the sealing elements contained therein incident to release of compression on the springs which normally serve to urge and maintain portions of the Teflon sealing wedges against tapered portions of the carbon seal rings for disposing the tips of the Teflon wedges in abutting-sealing relationship with and against the outer periphery of the agitator shaft.

DESCRIPTION OF THE DRAWINGS

FIG. 1 is a sectional view of one side of the seal cartridge of the present invention operatively associated with the upper end-adjacent portion of the agitator shaft of a chemical reactor vessel.

FIG. 2 is a sectional view of a detail of the seal cartridge of FIG. 1.

FIGS. 4, 5, and 6 are side elevational views partly in section illustrating a sequence of steps which precede removal of the seal cartridge from the agitator shaft of FIG. 1.

DESCRIPTION OF THE PREFERRED EMBODIMENT

Figure 3:
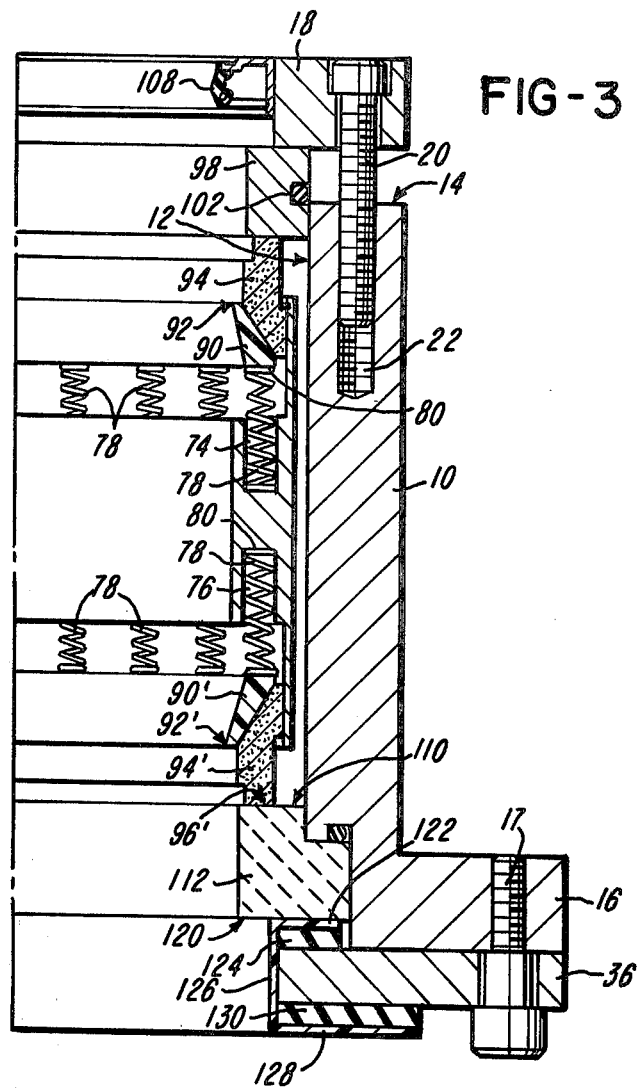
FIG. 3 is a view of the cartridge seal of FIG. 1 illustrating the relationship of the component parts thereof when removed from the agitator shaft of FIG. 1.

The seal cartridge of the present invention comprises a cylindrical outer housing 10 having an internal bore 12 which terminates at upper end 14. The lower end of the housing includes an outturned mounting flange 16.

The upper end of the cartridge is defined by a removable upper end plate or seal retainer ring 18 which is securely, though releasably, secured to body portion 10 by means of elongate bolts 20 which are received within the internally threaded portions of tapped holes 22.

In FIG. 1 the cartridge has been illustrated in its operative, fully sealed relationship with respect to agitator shaft 30 of a conventional chemical reactor vessel of the type which includes an upwardly projecting drive nozzle 32, the upper end of which terminates in an outturned flange 34. The lower surface of outturned flange 16 of body 10 is disposed in overlying relationship with the outer annular portion of a gasket plate 36 the lower surface of which plate is secured to a mounting plate 38 by means of bolts 40. As illustrated in FIG. 3 the gasket plate 36 is anchored to the lower axial surface of housing flange 16 by means of bolts 17.

The lower, axial, glassed surface 132 of insert 129 is forced against the upper axial surface of gasket 134 via mounting plate 38 which is drawn downwardly by bolts 39 the upper ends of which threadably engage bores 41 of plate 38. The heads 37 of bolts 39 engage lock washers 35 and the shanks 33 of said bolts extend through openings 43 of a split flange 45 which includes an internal offset 47 in which a split ring 51 is seated, said later ring having an annular recess therein for the reception of the lower surface of the outturned flange 34 of the drive nozzle 32.

The upstanding cylindrical wall 10 of the housing is provided with a pair of internally threaded openings A and B for the reception of an externally threaded fitting by which a lubricant under pressure is introduced and circulated interiorly of said housing.

An elongate cylindrical seal cage 50 having an outer surface 52, which is disposed in spaced relationship with respect to inner surface 12 of housing 10, and an inner surface 54 which is dimensioned for a slip fit with respect to enlarged portions C and D of the agitator shaft which, as illustrated in FIGS. 1 and 2, define upper and lower portions of an intermediate portion E of the shaft which is of a lesser diameter than portions C and D.

As clearly illustrated in FIG. 2, seal cage 50 is adapted to be securely, though releasably, anchored relative to reduced portion E of the agitator shaft by means of a plurality of set screws 60 which are disposed in spaced relationship around the seal cage.

A plurality of pipe plugs 62 are provided in internally threaded openings 64 through seal housing 10 in axial alignment with set screws 60 for affording access to set screws 60 when the pipe plugs are removed.

The upper end of cage 50 is provided with an upper inwardly open annular recess as defined by upstanding collar 70, and the lower end of the cage is provided with a lower inwardly open annular recess as defined by depending collar 72. An upper socket 74 and a lower socket 76 are provided in open communication respectively with the upper and lower inwardly open annular recesses. Compression springs 78 housed within sockets 74 and 76 abuttingly engage annular rings 80 which loosely circumscribe the outer periphery of the agitator shaft.

At this point it should be understood that those portions of the outer surface of the agitator shaft which are likely to be subjected to the deleterious effects of the products being processed in the vessel are provided with a glass-like coating indicated by the letter G which is chemically bonded to the outer surface of the shaft whereby to become an integral part thereof. The glass coating extends upwardly along the shaft to H (FIG. 1), it being noted that those portions of the shaft beyond, that is, upwardly from the upper terminus of glass coating G, are uncoated.

The seal cage 50 houses a pair of substantially triangular shaped sealing wedges 90 and 90' fabricated from Teflon having a lower surface or base which is disposed at substantially right angles with respect to the axis of shaft 30 which engages the upper surface of ring 80. The inner surface 92 of the apex of said wedge is adapted to slideably engage the outer surface of portion C of the upper, non-glassed portion of the agitator shaft. A ring member 94 of a carbon has an inclined inner surface which is adapted to abut portions of the outer inclined surface of wedge 90 and an upper axial surface 96 which is adapted to bear against the lower surface of the seal seat ring 98 the outer surface 100 of which is disposed in sliding relationship with respect to inner surface 12 of the seal housing 10 to which it is sealed by means of an O-ring 102 seated in an O-ring receptive groove 104.

The upper seal seat ring 98 is urged downwardly from an elevated position as illustrated in FIG. 3 to the lowered position illustrated in FIG. 1 by means of bolt 20 which extends through the upper end plate or seal retainer ring 18 which overlies ring 98.

A lip seal designated by the numeral 108 is secured to and carried by ring 18 whereby to engage the outer surface of the cylindrical portion F of the agitator shaft.

A lower triangular shaped sealing wedge 90' is provided between lower ring 80' and lower carbon ring 94'. The lower axial surface 96' of ring 94' is disposed in sliding abutting relationship with upper axial surface 110 of the lower non-metallic seal seat ring 112 of corrosion resistant material, such as by way of example, a high alumina ceramic material. Flange 114 of ring 112 is secured in sealing relationship with respect to the lower offset portion of housing 10 by means of an O-ring 116 seated within an O-ring receptive recess 118.

The lower axial surface 120 of the seal seat ring 112 is disposed in abutting relationship with the Teflon coating at 122 of a rubber seal pad 124 which is secured to and carried by the upper surface of the steel gasket plate 36. It will be noted that the Teflon coating extends down from surface 122 along 126 thence under at 128 of a second rubber seal pad 130 which is disposed beneath the inner portion of gasket plate 36.

A glassed insert 129, that is a steel ring having a glass coating 132 bonded thereto, is disposed beneath the gasket plate 36 and a Teflon envelope gasket 134 which overlies the upper surface of the flange 34 of the drive nozzle 32 of the vessel.

The inner surfaces of the nozzle 32 and the upper surface of the nozzle flange 34 are coated as at 136 with a glass coating whereby all portions of the impeller shaft from location H downwardly, all adjacent portions of the nozzle of the vessel, and all portions of the mounting means in the lower portion of the removable seal cartridge are fabricated from or are suitably coated with substances which are impervious to the deleterious action of the materials processed within the vessel (not illustrated) from which the nozzle projects.

It will be understood that when upper seal retainer ring 18 is in a fully lowered position as illustrated in FIG. 1, the tip 92 of the upper wedge shaped seal 90 will be disposed in seal-tight, resilient, leak-proof relationship with respect to portion C of the agitator shaft whereas tip 92' of the lowermost wedge shaped seal 90 will be disposed in seal-tight, leak-proof, resilient, abutting relationship with respect to the glass coated surface of portion J of the agitator shaft.

With reference now to FIGS. 4 and 5 the numeral 150 designates the bearing cap of the speed reducer of a drive mechanism, not illustrated, in which output shaft 152 is suitably journaled whereby to not only rotatably drive but also rotatably support the entire weight and accommodate the dynamic loadings, both axial and radial, which are imparted to the agitator shaft 30 incident to agitation thereof, in such a manner as to render unnecessary the need for bearings beneath the bearing cap and/or in the housing of the cartridge seal. The lower end of agitator shaft 30 is provided with a coupling member 154, and the upper portion K of the agitator shaft is provided with a complementary coupling member 156, and when said coupling members are interconnected, such as by way of example by bolts 158, the agitator shaft and its coupling member 156 are disposed in a fully elevated position wherein the agitator shaft is rotatably suspended from output shaft 152 via coupling member 154.

When it becomes necessary or desirable to remove the seal cartridge from its operative sealing engagement with the upper end-adjacent portion of the agitator shaft, pipe plugs 62 are removed from housing 10 thereby providing access to the set screws 60 which securely, though releasably, anchor the seal cage 50 relative to reduced portion E of the agitator shaft thereby permitting relative axial movement of the agitator shaft within the seal cage. As bolts 158 are removed, coupling member 156 and agitator shaft 30 are lowered a slight amount for disposing the lower surface 160 of coupling 156 in contacting, abutting relationship with respect to the upper surface 162 of the seal retainer plate 18 of the seal housing 10, as illustrated in FIG. 5, whereby support of the agitator shaft 30 will have been transferred from output shaft 152 to housing 10 which in turn is releasably secured to mounting flange 38 which is supported on the vessel (not illustrated) from which the drive nozzle 32 projects whereby said housing may be said to be supported relative to the out-turned flange 34 of drive nozzle 32 of the vessel.

The resultant spacing between coupling members 154 and 156 permits the drive mechanism including bearing cap 150, actuator shaft 152, and coupling member 154 to be moved whereby to provide free unobstructed access to the upper end of the agitator shaft, the seal housing, and seal cartridge therein in the space previously occupied by said drive means when in driving connection with the agitator shaft as in FIG. 4.

Bolts 40 are then removed for thereby disconnecting mounting flange 16 and gasket plate 36 from mounting plate 38 after which jack screws 170 may be introduced into internally threaded bores 172 of mounting flange 16 and gasket plate 36 for thereby elevating the entire seal housing and the agitator shaft suspended therefrom via coupling member 156 for elevating lower surface of gasket plate 36 above mounting plate 38 and the glassed insert 129 by an amount sufficient to permit the insertion of a pair of resilient catcher halves 180 between the glassed insert 129 and the outwardly tapered glass lined portion W of the agitator shaft 30 as clearly illustrated in FIG. 6. After the catcher halves 180 have been thus located, the jack screws are rotated to lower the seal housing whereby the agitator shaft is also lowered from the fully elevated position which was necessary to enable the catcher halves 180 to be inserted over glassed insert 129 and beneath portion W until portion W engages the catcher halves at which time the agitator shaft is fully supported by said catcher halves, as illustrated in FIG. 6.

Further lowering of housing 10 will elevate the shaft within the housing and relative to the seal cage whereby lower surface 160 of coupling member 156 will be spaced above upper surface 162 of the upper end plate or seal retainer ring 18 of the housing by about $\frac{1}{4}$ inch.

After the agitator shaft has thus been fully suspended relative to the drive nozzle, coupling member 156 is then disconnected from the upper end K of the agitator shaft. Thereafter bolts 20 are loosened permitting the seal retainer ring 18 to move upwardly as in FIG. 3, away from the upper end 14 of the housing by the action of springs 78 which effectively elevate the seal seat ring 98 as illustrated in FIG. 3 whereby the sealing relationship imparted to the sealing wedges 90 and 90' with respect to outer surfaces C and J respectively of the agitator shaft will be substantially lessened and released thereby facilitating the upward movement of the entire seal housing 10 and the seal cartridge contained therein upwardly along and then off the upper end K of the agitator shaft 30 for purpose of inspection and repair or replacement of the seal cartridge with another similar cartridge.

It will be noted that removal of the seal retainer ring 18 from the upper end of the seal housing 10 will facilitate withdrawal of the upper seal seat ring 98 from the internal bore 12 of the housing after which the carbon rings 94 and 94', the triangular sealing wedges 90 and 90', are removable along the seal cage 50 thereby enabling the sealing wedges and carbon ring members to be inspected and/or replaced.

When the entire housing assembly of FIG. 3 has been removed from the agitator shaft, the ceramic lower seal seat ring 112 may be removed from the lower end of the housing incident to removal of the gasket plate 36 when bolts 17 are removed for releasing plate 36 from flange 16 of the housing, whereupon the entire seal cage 50 and the sealing members carried thereby may be removed via the bottom opening of the housing.

In the preferred embodiment of the invention when the sealing means are being associated with the housing the lower ceramic seal seat ring 112 is carefully inserted into the lower end of the inner bore 12 of the housing and then secured in place via the gasket plate 36. Then the seal, including items 94'-94, 90'-90, 78, and 80 are lowered into the housing after which the seal seat ring 98 is introduced, as illustrated in FIG. 3, after which the entire seal assembly is lowered over the upper end of the agitator shaft to the position illustrated in FIG. 1. Thereafter the upper seal seat ring 98 is forced downwardly by ring 18 so bolt 20 is threaded into the upper end of the housing whereby springs will be compressed and items 94'-94, 90'-90, 78, and 80 will assume the sealing relationship of FIG. 1.

When fully assembled, as in FIG. 4, a lubricant is continuously circulated throughout the annular passageway P defined by the adjacent surfaces of housing 10 and cage 50, it being understood that the lubricant is confined to said channelway and prevented from escape toward the agitator shaft by reason of the contact-sealing relationship, which is established when the parts are fully assembled as in FIG. 1, between axial surface 96 of upper carbon ring member 44 with the lower axial surface of the seal seat ring 98 and by reason of the contact-sealing relationship between axial surface 96' of the lower carbon ring member 94' with the upper axial surface 110 of the lower seal seat ring 112. Seal cage 50 rotates with the agitator shaft to which it is releasably anchored by means of set screws 60.

The relationship of sealing wedges 90 and 90' to the respective surfaces C and J of the agitator shaft are such as to effectively prevent the passage of fumes, vapors, and/or fluids in either direction along and relative to the upper end-adjacent portion of the agitator shaft.

From the foregoing it will be noted that the entire seal cartridge, which as illustrated in FIG. 3, includes the housing 10, gasket plate 36, seal retainer ring 18, and all of the items contained within the housing, viz the seal cage 50, Teflon sealing wedges 90-90', carbon ring members 94-94', spring 78, upper seal seat ring 98 and lower seal seat ring 112, are removable and replaceable as a unit.

The accidental or unintentional removal of carbon rings 94 and 94' from their respective ends of the recess in opposite ends of seal cage 50 may be precluded by means of snap rings carried by the inner surfaces of the outermost ends of said recess whereby said snap rings will engage an offset in the outer surfaces of said rings.

If desired, a leak indicator L in the form of an elongate hole through the seal retainer ring 18 at a location below lip seal 108 may be provided for providing an easily observable means for detecting the occurrence of leakage upwardly along the agitator shaft.

What is claimed is:

1. A removable seal cartridge assembly for the upper end adjacent portion of an agitator shaft which projects outwardly from the drive nozzle of a chemical reactor vessel, which comprises:
   (a) an agitator shaft;
   (b) a drive means movable between a first position in axial alignment with said agitator shaft and a second position which provides free unobstructed access to the upper end of the agitator shaft;
   (c) means for selectively and releasably interconnecting the agitator shaft in driven relationship with said drive means;
   (d) an elongated housing releasably secured to a reactor vessel and having upper and lower ends with an axial bore therethrough, said agitator shaft extending through said bore into said reactor vessel with said housing being positioned below said releasably interconnecting means;
   (e) an elongated cylindrical seal cage in said housing, said seal cage having inner and outer surfaces and upper and lower ends wherein the outer surfaces are disposed in laterally spaced relationship with respect to the inner surface of the housing and wherein the inner surface of the cage provides a slip fit with respect to the outer surface of the agitator shaft;
   (f) means releasably anchoring said seal cage to the agitator shaft for rotation therewith; and (g) means in said housing for supporting said seal cage for common removal with said housing whenever said housing is moved axially upward to the space occupied by said drive means in said first position subsequent to moving said drive means to said second position.

2. A seal cartridge as called for in claim 1, wherein access means are provided through the housing adjacent the upper and lower ends of the chamber between the housing and seal cage for enabling lubricant to be circulated through said chamber.

3. A seal cartridge as called for in claim 1, wherein opposite ends of the seal cage are provided with an annular recess defined by an elongate outer wall spaced radially outward from the inner surface of the cage and a bottom wall at right angles therewith, said first and second sealing means housed within said recesses.

4. A seal cartridge as called for in claim 1, wherein the means which define the upper and lower ends of the elongate channel between the adjacent spaced surfaces of the housing and seal cage comprise an upper and a lower annular seal seat the inner surfaces of which are spaced radially from the rotatable agitator shaft, said seal seats each having upper and lower axial surfaces.

5. A seal cartridge as called for in claim 4, which includes an annular plate having a lower axial surface which spans portions of the upper end of the housing and the upper surface of the upper seal seat, and means for securely though releasably anchoring said annular plate to the housing.

6. A seal cartridge as called for in claim 4, wherein the first sealing means comprise upper and lower carbon rings each having an end axial sealing surface in rotary fluidtight sealing engagement with the adjacent axial surfaces of the upper and lower seal seats, an outer surface in sliding abutment with the inner surface of the outer wall of the recess of the seal cage, and an inner surface which tapers outwardly toward the outer wall of the recess.

7. A seal cartrdige as called for in claim 6, wherein the second sealing means comprise an upper and a lower substantially triangularly shaped sealing ring of resilient material, each ring having an outer tapered surface which is disposed in contacting relationship with the inner tapered surface of a ring of the first sealing means, a base surface which is disposed at substantial right angles with the axis of the seal cage, and an inner surface which tapers inwardly from the base surface toward and into fluidtight sealing engagement with the agitator shaft.

8. A seal cartridge as called for in claim 3, wherein the bottom wall of each recess includes a plurality of compression-spring-receptive sockets.

9. A seal cartridge as called for in claim 8, wherein a flat ring having upper and lower axial surfaces is located within each recess in spaced relationship with the agitator shaft, compression springs in said sockets engaging an axial surface of a ring for disposing the other axial surface of each ring in abutment against the base surface of the said second sealing means mounted in said recesses.

10. A seal cartridge as called for in claim 7, wherein that portion of the agitator shaft adjacent and which projects outwardly from the drive nozzle is provided with a ceramic coating permanently bonded thereto, wherein the terminal portion of the shaft extends beyond said coated portion, and wherein the uppermost of the second sealing means is disposed in fluidtight sealing engagement with the agitator shaft above the coated portion thereof, and the lowermost of the second sealing means is disposed in fluidtight sealing engagement with the coated portion of the agitator shaft.

11. A seal cartridge as called for in claim 10, wherein those portions of the agitator shaft which are engaged by the second sealing means comprise vertically spaced cylindrical portions which are disposed on opposite sides of an intermediate cylindrical portion of lesser diameter, and wherein the means for releasably anchoring the seal cage relative to the outer surface of the agitator shaft includes set screws which threadably engage the seal cage for movement into said shaft portion of reduced diameter for locking the seal cage to the agitator shaft against relative endwise or rotational movement therewith.

12. A seal cartridge as called for in claim 10, wherein the second sealing means are fabricated from fluorocarbons such as "Teflon".

13. A seal cartridge as called for in claim 11, wherein the upper end of the agitator shaft projects upwardly beyond the upper surface of the annular plate which spans and engages the upper end of the housing, and wherein a coupling member is secured to and carried by the upper end of the shaft whereby the shaft is rotatably suspended from the output shaft of a drive mechanism when the seal cage is locked to the shaft for rotation therewith, said coupling member and shaft adapted to be lowered relative to the seal cartridge when the seal cage is unlocked from the shaft and the coupling means is disconnected from said output shaft until the said coupling member engages the upper surface of said annular plate for transferring support of the agitator shaft from the drive means to the housing of the cartridge.

14. A seal cartridge as called for in claim 13, wherein the agitator shaft includes an outwardly projecting support surface at a location spaced from and below that portion of the shaft which is engaged by the lowermost of the second sealing means wherein the diameter of said support surface is less than the diameter of a shaft-receptive opening through the lowermost of the seal seats.

15. A seal cartridge as called for in claim 14, wherein means are provided adjacent the lower end of the housing for selectively elevating and thereafter lowering the entire seal cartridge and the agitator shaft suspended therefrom relative to the drive nozzle of the reactor vessel by an amount sufficient to provide an annular space below the housing for the reception of the complementary halves of a resilient catcher ring beneath the outwardly projecting support surface of the shaft, wherein said catcher ring is supported relative to the drive nozzle of the vessel.

16. A seal cartridge as called for in claim 15, wherein lowering of the seal housing and agitator shaft from an elevated position above the catcher ring transfers the suspension of the agitator shaft from the cartridge housing to the drive nozzle of the vessel via the catcher ring, thereby permitting the entire cartridge housing to be slid upwardly off the upper end of the agitator shaft incident to removal of the coupling means from the upper end thereof.

17. A seal cartridge as called for in claim 4, which includes an annular gasket plate positioned beneath and in supporting relationship with respect to the lower seal seat, said gasket plate having a portion which projects inwardly of the lower surface of the mounting flange of the housing, and wherein the upper, inner, and lower surfaces of the inner portion of said gasket plate are encapsulated with a corrosion resistant "Teflon" coating which provides a corrosion resistant surface on those portions of the gasket plate which, but for said coating, would be subject to exposure to the gases, vapors, and/or liquids of the reactor vessel.

18. A seal cartridge as called for in claim 17, wherein the annular gasket plate includes upper and lower axial surfaces and inner and outer edges, and wherein the inner end-adjacent surfaces of the upper and lower axial surfaces are provided with a resilient seal pad, and wherein a continuous "Teflon" coating is disposed in overlying relationship with the outer surfaces of the resilient seal pads and the inner edge of the gasket plate.

19. A seal cartridge as called for in claim 18, wherein the lower axial surface of the lower seal seat engages the "Teflon" coating on the resilient seal pad on the upper axial surface of the gasket plate.

20. A seal cartridge as called for in claim 4, wherein the lower of said seal seats is fabricated from a corrosion resistant material.

21. A seal cartridge as recited in claim 1 wherein the top portion of said housing includes means for selectively supporting said agitator shaft subsequent to releasing said interconnecting means.

22. A seal cartridge as recited in claim 21 further including means for transferring support of said agitator shaft from said housing to said reactor vessel.

* * * * *